Figure 6:
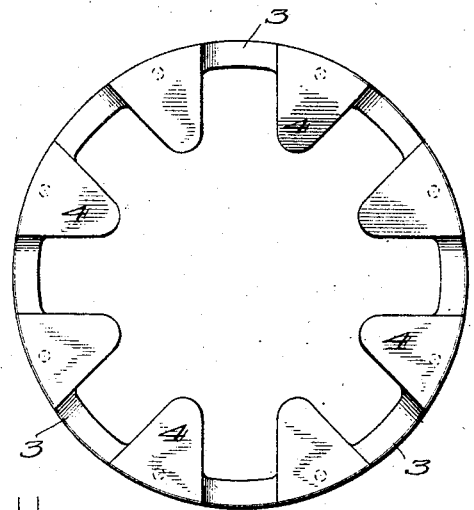

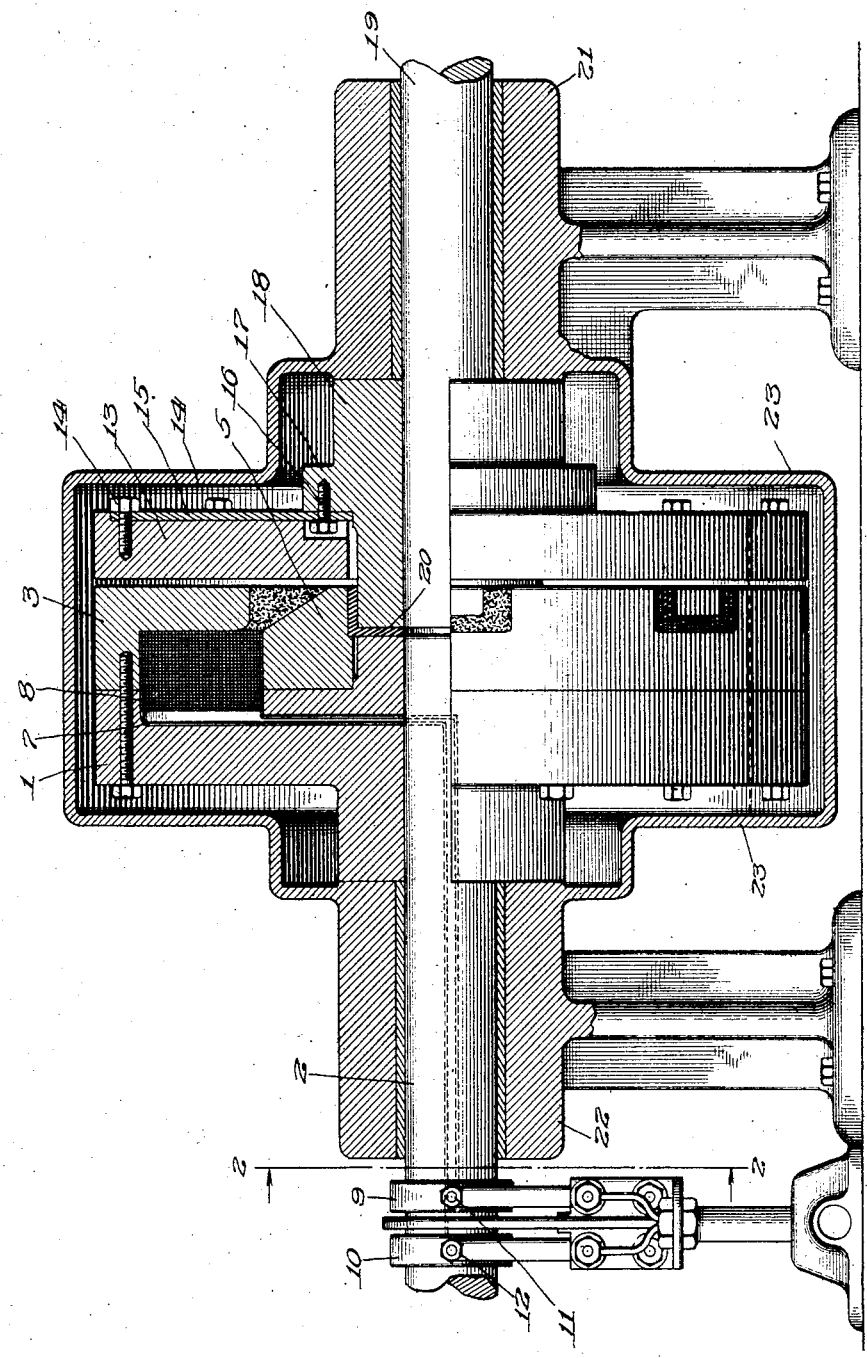

No. 786,414. PATENTED APR. 4, 1905.
H. H. CUTLER.
METHOD OF POWER TRANSMISSION.
APPLICATION FILED MAY 19, 1904.
4 SHEETS—SHEET 2.
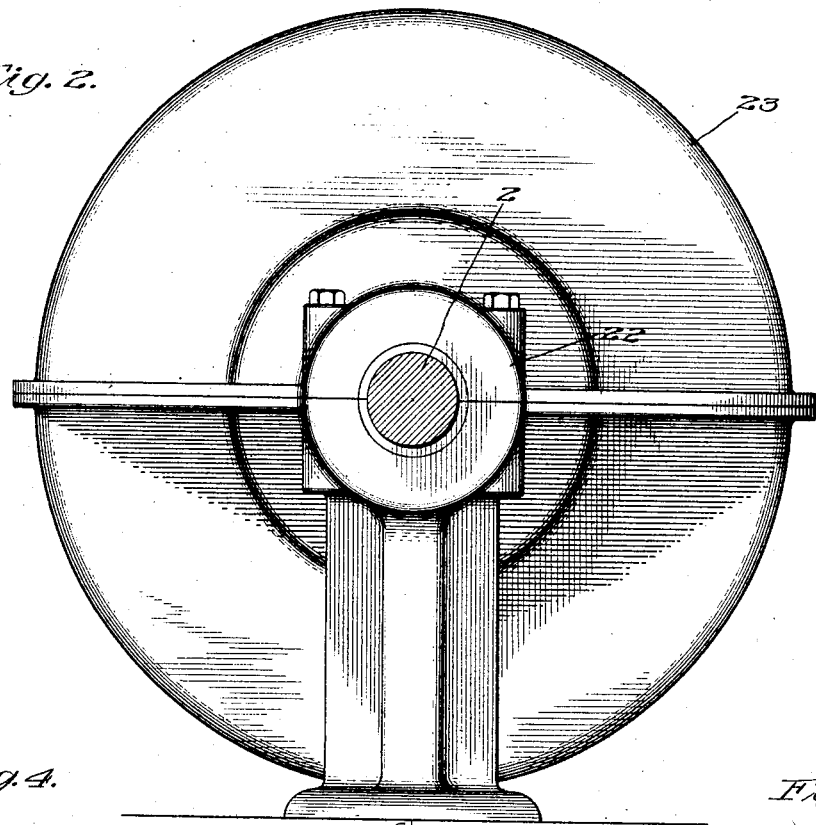
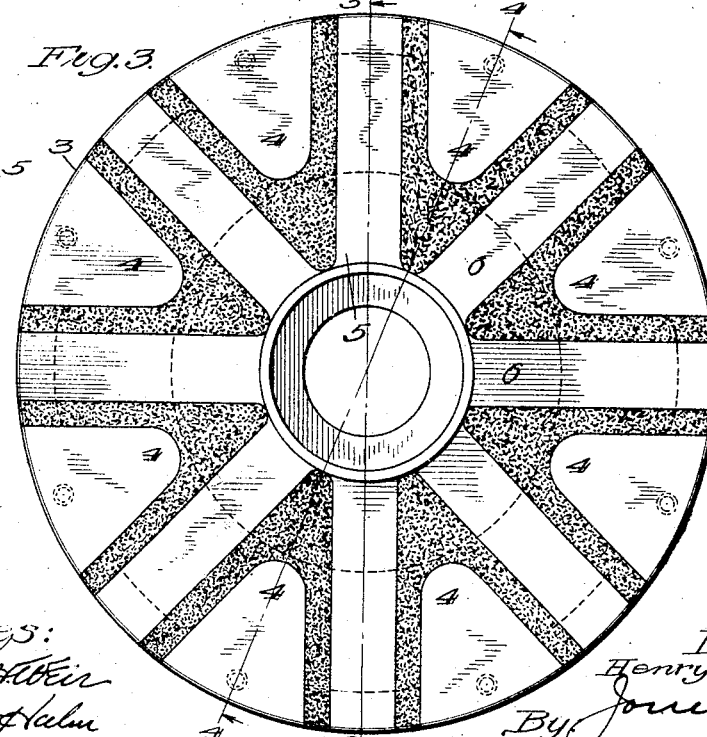
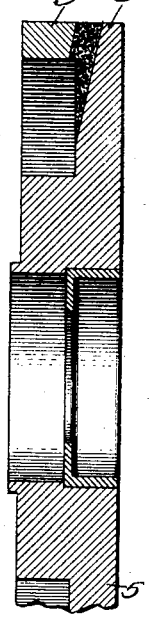
Witnesses:
Robert H. Beir
W. Perry Hahn
Inventor:
Henry H. Cutler
By Jones & Addington
Attorneys No. 786,414. PATENTED APR. 4, 1905.
H. H. CUTLER.
METHOD OF POWER TRANSMISSION.
APPLICATION FILED MAY 19, 1904.

4 SHEETS—SHEET 3.

Witnesses:
Robert H. Weir
M. Perry Hahn

Inventor:
Henry H. Cutler
By: Jones Addington
Attorneys.

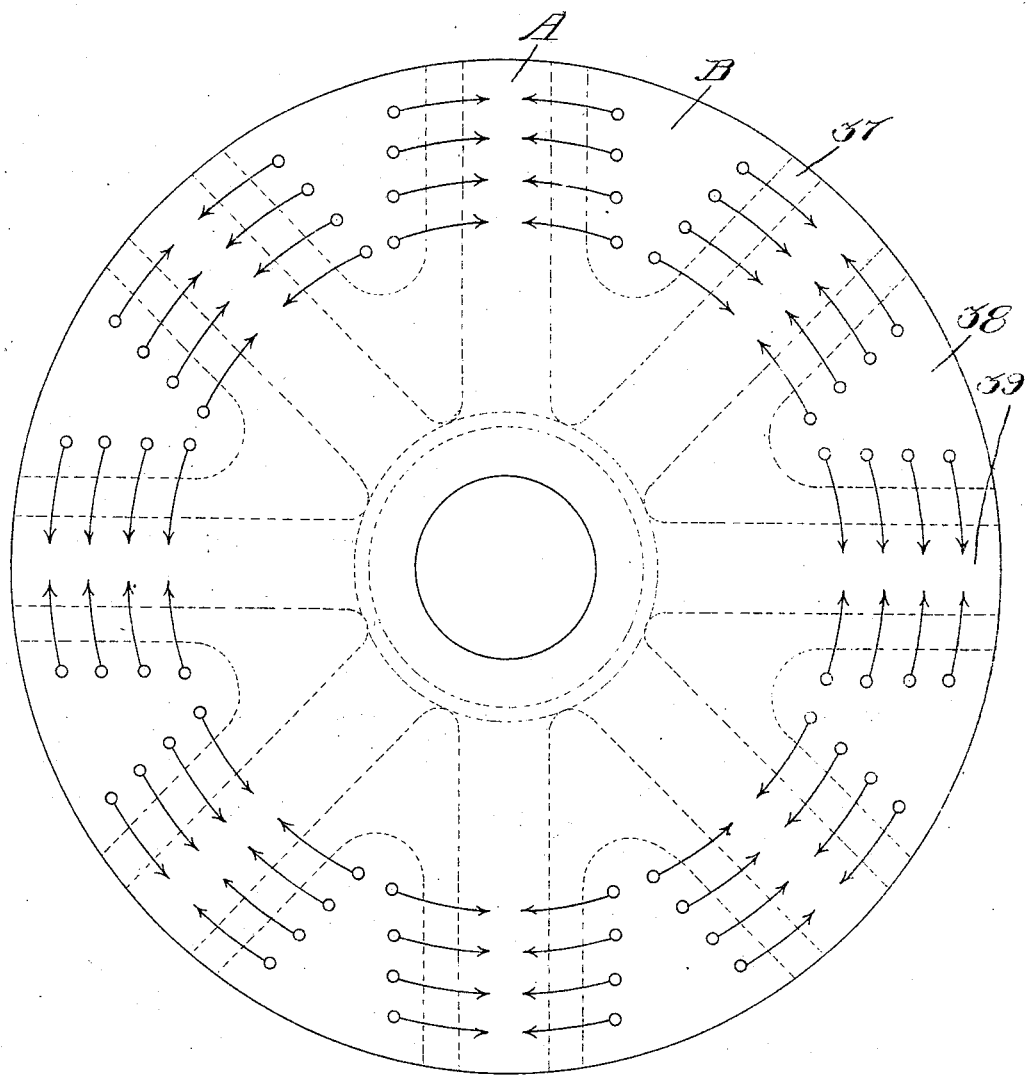

No. 786,414. Patented April 4, 1905.

UNITED STATES PATENT OFFICE.

HENRY H. CUTLER, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

METHOD OF POWER TRANSMISSION.

SPECIFICATION forming part of Letters Patent No. 786,414, dated April 4, 1905.

Application filed May 19, 1904. Serial No. 208,783.

*To all whom it may concern:*

Be it known that I, HENRY H. CUTLER, a citizen of the United States, residing at Milwaukee, in the county of Milwaukee and State of Wisconsin, have invented new and useful Improvements in Methods of Power Transmission, of which the following is a full, clear, concise, and exact description, reference being had to the accompanying drawings, forming a part of this specification.

My invention relates to a novel method of transmitting power from a driving to a driven part, the object being to operate the driven part at any desired speed equal to or less than that of the driving part and to cause said driven part to attain speed gradually and without shock.

In carrying out my method I preferably introduce between the machinery to be driven and the driving machinery a slip which permits the driven machinery to attain full speed gradually and which is controllable and subject to the will of the attendant. I produce this controllable slip by means of one of the clutches or speed-accelerators described and claimed in my application for United States Letters Patent, filed August 5, 1903, Serial No. 168,388, wherein I have described and claimed the several mechanical features of a clutch which constitutes a slip device having the above-mentioned characteristics. In this slip device I utilize the combined effect of friction and induction for accelerating the driven member, whereby the driving member exerts upon the driven member a torque which is so proportioned as to cause a gradual acceleration of the driven member. I also attain a gradual acceleration of the driven member by so constructing the slip device that considerable inductance is developed therein and the energizing current therefore does not bring the magnetic field to full strength immediately, as is the case with an ordinary magnetic clutch, but causes the strength of the magnetic field to gradually increase, thereby exerting a gradually-increasing torque upon the driven member. With respect to the first-mentioned cause of gradual acceleration it is a well-known fact that if a driven member of a clutch be forced against the driving member with a practically constant force, as is the case with ordinary magnetic clutches, the driven member accelerates in an incredibly short space of time, producing the undesirable jerk and shock which has previously rendered the use of magnetic clutches prohibitive, except in very few and exceptional instances.

In the clutch of my invention, as previously stated, I utilize the combined effects of friction and induction. The frictional effect is a practically constant force during the period of acceleration, while the inductional effect is a uniformly-decreasing force during the period of acceleration. The resultant force is therefore a force which gradually decreases throughout the period of acceleration. Due to the employment of a force which thus gradually decreases throughout the period of acceleration I am enabled to modify the law in accordance with which the ordinary magnetic clutch operates, in which the acceleration increases as the time, and am therefore enabled to provide a clutch in which the acceleration increases at a much slower rate.

With respect to attaining a gradual acceleration by constructing the slip device so that considerable inductance is developed therein, I preferably attain this result by constructing the field-magnet, which constitutes the inducing member of the clutch, so the exciting-coil will be entirely surrounded by iron, thus creating a large amount of inductance, so that when the circuit through the energizing-coil is completed the current through the energizing-coil, and consequently the strength of the magnetic field, will increase slowly. The sudden rising of magnetism to full strength, as in the case of ordinary magnetic clutches, resulting in extremely sudden acceleration, is thus entirely obviated.

Another advantage which I am enabled to attain by the use of a slip device as above described is the instantaneous separation of the driving and the driven parts when it is desired to stop the driven part. This is due to the peculiar construction of the clutch whereby the residual magnetism of the field-magnet member, which usually serves to attract the armature member for a definite period after the current through the energizing-coil is opened, is caused to rapidly disappear, due to the fact that the field-magnet is subdivided into a large number of individual magnetic circuits, which when the energizing-windings are deprived of current neutralize each other, thereby causing the rapid disappearance of the residual magnetism.

Figure 7:
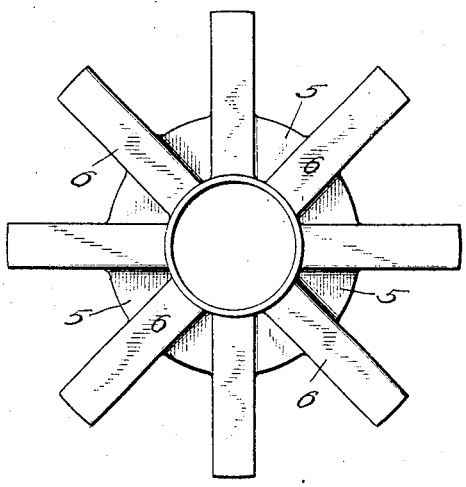
Figure 8:
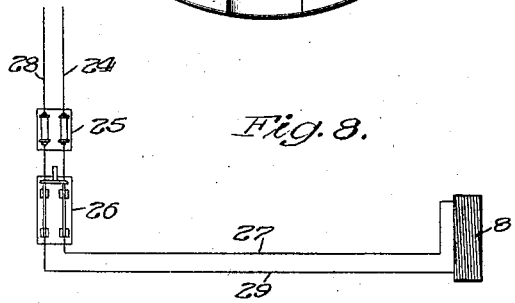
Figure 9:
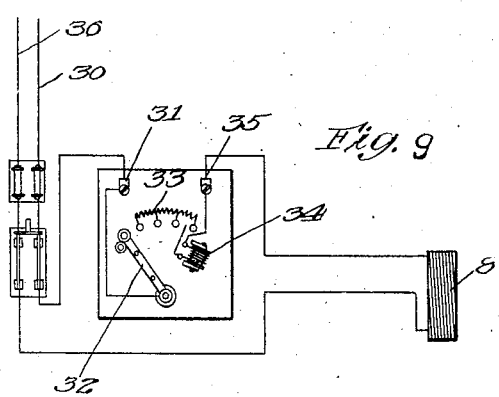
Figure 10:
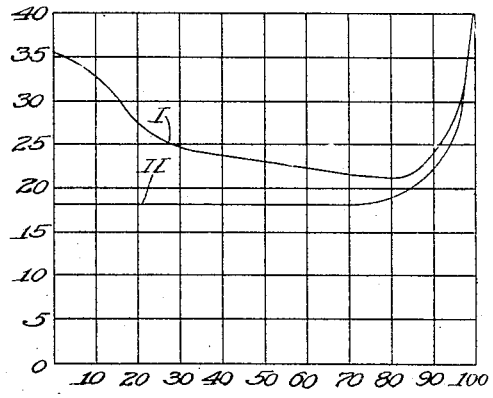

In the accompanying drawings, showing means for practicing my improved method, Figure 1 is a view, partially in longitudinal section, illustrating the apparatus. Fig. 2 is an end view thereof. Fig. 3 is a face view of the field-magnet member. Fig. 4 is a sectional view through the line 4 4 of Fig. 3. Fig. 5 is a sectional view through the line 5 5 of Fig. 3. Fig. 6 is a view of one of the parts which compose the field-magnet member. Fig. 7 is a view of another of said parts. Fig. 8 is a diagram of the circuit connections. Fig. 9 is a modification thereof. Fig. 10 is a curve illustrating the torque developed by the clutch constructed in accordance with my invention, and Fig. 11 is a diagrammatic face view of the magnetic field of my clutch.

In the apparatus as herein shown for carrying out my method I provide a clutch, comprising a field-magnet member and an armature member adapted to be inductively influenced thereby. The field-magnet member comprises, as illustrated, a back plate or disk 1, which is mounted upon a shaft 2. To the face of this disk or back plate two rings are secured. One of these rings, 3, is provided with a plurality of inwardly-extending pole-pieces 4 4, these pole-pieces being in the present instance substantially triangular in shape. The other ring, 5, is provided with radially-extending pole-pieces 6 6, which, as shown, are substantially rectilinear in shape, and which when the rings are placed together, as shown in Figs. 1 and 3, are adapted to rest in the space between the triangular pole-pieces above mentioned. An annular channel 7 is provided in the face of the back plate, and the rings 3 and 5 when placed together form an annular channel which coöperates with the channel 7 in forming a chamber for the reception of the annular winding 8 of the clutch. The terminals of the winding or coil 8 extend through suitable openings in the back plate 1 and in the shaft 2 and are connected, respectively, with rings 9 and 10, upon which rest brushes 11 and 12, respectively, which brushes are connected with any suitable source of supply for furnishing current to the clutch-winding.

The armature 13 is of annular form and in the present instance is secured by means of bolts 14 14 to the periphery of a steel disk, the inner edge of which is secured by means of bolts 16 to a flange 17, carried upon the hub 18, which is keyed to a shaft 19. A cup 20 fits in a suitable opening in the magnet member and the end of the shaft 19 is adapted to fit in this cup, whereby the shafts 2 and 19 are held in alinement. The spaces between the poles carried on the rings 3 and 5 are filled with Babbitt or other non-magnetic material. This material serves to entirely inclose the winding, and thus protect the same from injury and also from the oil employed for lubricating purposes. Moreover, the Babbitt metal affords with the pole-pieces a continuous frictional surface, against which the face of the armature is adapted to bear. The shafts 2 and 19 are journaled in suitable bearings 21 and 22, and these bearings are preferably formed continuous with an inclosing shell 23, which serves the double purpose of excluding dust and dirt and retaining the oil. By the employment of this shell the clutch may be subjected to an oil-bath. Oil placed in the shell will be picked up by the periphery of the clutch and will be carried to the frictional surfaces between the armature and the magnet member. The circuit arrangement of this form of apparatus for carrying out my method is shown in Fig. 8. Current entering the supply-main 24 passes through the fuse 25 and the knife-switch 26, through the conductor 27, winding 8 of the clutch, and thence back to the opposite main by conductor 29. In Fig. 9 is shown a modification of the circuit arrangement, in which means are introduced controlling the current admitted to the clutch-winding, and thereby the clutch. By this arrangement current entering by supply-main 30 passes through the fuse and switch to binding-post 31, thence to contact-arm 32 of the controlling-rheostat through resistance 33, when the contact-arm is moved to close the circuit, thence through the retaining-magnet 34 to the binding-post 35, thence through the clutch-winding 8 to the opposite supply-main 36.

In Fig. 10 I have illustrated by means of a curve the variation of the torque as the speed of the driven part increases. The curve I represents the torque due to the combined inductive and frictional effects in one of my clutches. The curve I I is the curve of friction. The abscissæ of the curves are the percentages of full speed, while the ordinates are torque in pounds at a one-foot radius. These curves relate to the conditions when the driving part is run at a speed of nine hundred revolutions per minute, the number of poles on the clutch being sixteen, the current being 0.12 amperes at one hundred and ten volts, the ampere-turns being two hundred and fifty. The total torque curve may be altered in form to meet different requirements by changing the exciting-poles, the number of poles, and the relative dimensions of the parts. It will be noted that in curve I the torque is a maximum at starting and gradually decreases. The curve I touches the curve I I near the full speed, which indicates that at this point the inductive effect is practically *nil*. The curve rises rapidly, almost abruptly, as full speed is approached, and this sudden rise is due to the friction of rest, which is considerably greater than the friction of motion. The increased torque is thus produced at precisely the point where it is desired in practice—that is, at the time of starting the driven part from rest and at the time of bringing the driven part to full speed. The dip in the curve at intermediate points affords an excellent opportunity for the control and regulation of acceleration, permitting the attendant to gage the period of starting as desired.

With the apparatus as set forth current which is just sufficient to start the driven part from rest is not sufficient to accelerate the driven part to full speed, and accordingly it is necessary to increase the energizing-current in order to bring the driven part to full speed. This fact permits ready control of the period of starting. By the employment of a rheostat, as illustrated in Fig. 9, current is first closed through a series of resistances and current is thus admitted to the clutch-winding of sufficient strength to start the driven part from rest. Thereafter the resistance is removed step by step as it is desired to accelerate the driven part, until when the resistance is entirely removed from circuit the driven part is running at full speed. The retaining-magnet 34 serves to retain the switch-arm 32 in the full "on" position through the agency of a spring or other suitable means, thereby opening the circuit through the clutch and bringing the driven part to rest.

It will be noted from the foregoing description that I am enabled to provide a method of producing a rotation of the driven member of a clutch or accelerator by creating a magnetic field in one of the clutch members, (either the driving or driven member,) subjecting the other member to the inductive influence thereof, positively rotating one of said members (the driven member) in mechanical contact with the other member to cause said latter-mentioned member to rotate by induction. I am also enabled to provide a method as above described, with the modification that the two members press against each other with a definite mechanical pressure, whereby the friction between the two members assists the inductive effect in rotating the driven member. It will also be noted that by my method I provide rotation of the driven member of a clutch or accelerator wherein a magnetic field is created in one member having suitable polar surfaces, a second member being opposed thereto in mechanical contact, the lines of force being constrained to flow in substantially tangential paths in passing from pole to pole through said second member, one of said members being positively rotated, whereby the other is rotated through the influence of the inductive action of the lines of force traveling in paths which produce the maximum turning effort for a given energizing power. It will be further noted that by my method I am enabled to produce a gradual acceleration of the driven part of my device and do not have the jar or shock in starting which is so noticeable in most methods of transmitting power from a driving to a driven part. This is partially due to the provision of the primary or inducing member of the clutch or accelerator with an exciting-coil which is entirely surrounded by iron, thus creating a large amount of inductance, so that when the current through the energizing-coil is completed current through the energizing-coil, and consequently the strength of the magnetic field in the inducing member, will increase slowly. A second cause for this acceleration is due to the combined inductional and frictional effect of the driven member upon the driving member, which causes the driving member to exert upon the driven member a torque which is so proportioned as to cause a gradual acceleration. It is a well-known fact that if the driven member of a clutch be forced against the driving member with a practically constant force, as is the case with an ordinary magnetic clutch, the driven member accelerates in an incredibly short space of time, producing the noticeable jerk and shock to the machinery which is incident to the employment of these magnetic clutches.

In the method as set forth the acceleration is due to the combined effects of friction and induction. The frictional effect is practically a constant force during the period of acceleration, while the inductional effect is a uniformly-decreasing force during the period of acceleration. The resultant force is therefore a force which gradually decreases throughout the period of acceleration. Due to the employment of a force which thus gradually decreases throughout the period of acceleration I am enabled to modify the law in accordance with which the ordinary magnetic clutch operates. A further feature of my method is that provision is made whereby the driving and driven members may be practically instantaneously separated. It is a well-known fact that after the energizing-current ceases the residual magnetism of the field-magnet member of a magnetic clutch will serve to attract the armature member for a definite period. It is desirable, however, in practice that after the opening of the circuit through the energizing-coil the driven and driving members should separate almost instantly, and in practicing my method I have made provision for this feature. This result I attribute principally to the subdividing of the field-magnet of the clutch into a large number of individual circuits, which aid in causing a rapid disappearance of the residual magnetism in the armature member when the magnetizing force is withdrawn. By the subdivision of the field-magnet into a number of individual circuits the flux flowing through the armature member is caused to flow in adjacent parts in opposite directions, which meet and pass through the field member without interfering as long as the magnetizing force is constant. However, as soon as this force is withdrawn the oppositely-flowing fluxes in the armature member meet in opposition to each other, and thereby neutralize each other. As an illustration of this feature reference may be had to Fig. 11, in which is shown a diagrammatic face view of a magnetic field of my clutch and in which the numeral 37 represents the armature member in front of the field-member formed of the inwardly-projecting pole-pieces 38 and the outwardly-projecting pole-pieces 39. (Shown in dotted lines.) It will be assumed that the magnetic flux starts from the inwardly-projecting pole B and comes up vertically through the plane of the magnet member, as shown by the dots. This flux will then pass into the armature member and divide, half of it passing to the left and half to the right. The left-hand portion will pass down into the outwardly-projecting pole B into the back plate 1, then flowing in a right-hand direction back to the starting-point. The right-hand portion of the flux which divides at B will pass down through the outwardly-projecting pole C into the back plate 1 and flowing in a left-hand direction back to the starting-point. The armature member then has flux flowing in adjacent parts in opposite directions which meet and pass down through the poles A and C without interfering so long as the magnetizing force continues. The moment, however, the magnetizing-flux is withdrawn it will be seen that these two oppositely-flowing fluxes meet in opposition to each other in the armature-disk and destroy each other.

While I have shown in the accompanying drawings one apparatus for carrying out my improved method, it will be understood that I do not wish to limit myself to this particular apparatus, as there are various means for accomplishing the method which I have illustrated or described in this application.

Having thus described my invention, what I claim as new, and desire to secure by Letters Patent, is—

1. The method of gradually and without shock accelerating the driven part of a clutch, which consists in causing the driving part to impress a graduated torque on the driven part, said torque being jointly produced by electromagnetic induction and friction.

2. The method of accelerating gradually and without shock the driven part of a clutch and bringing the driven part to the speed of the driving part, which consists in causing the driving part to impress a graduated torque upon the driven part, said torque being jointly produced by electromagnetic induction and friction.

3. The method of gradually and without shock accelerating the driven part of a clutch, which consists in causing the driving part to impress an automatically-graduated torque on the driven part, said torque being jointly produced by electromagnetic induction and friction.

4. The method of accelerating gradually and without shock the driven part of a clutch and bringing the same to the speed of the driving part, which consists in causing the driving part to impress an automatically-graduated torque on the driven part, said torque being jointly produced by electromagnetic induction and friction.

5. The method of gradually and without shock accelerating the driven part of a clutch, which consists in causing the driving part to impress a graduated torque on the driven part, said torque being jointly produced by electromagnetic induction and friction, the electromagnetic effect thereof first preponderating but being gradually replaced by the frictional effect.

6. The method of gradually and without shock accelerating the driven part of a clutch and bringing the same to speed, which consists in causing the driving part to impress a graduated torque on the driven part, said torque being jointly produced by electromagnetic induction and friction, the electromagnetic effect at first preponderating but being gradually replaced by the frictional effect.

7. The method of gradually and without shock accelerating the driven part of a clutch, which consists in causing the driving part to impress an automatically-graduated torque on the driven part, said torque being jointly produced by electromagnetic induction and friction, the electromagnetic effect at first preponderating but being gradually replaced by the frictional effect.

8. The method of gradually and without shock accelerating the driven part of a clutch and bringing the same to speed, which consists in causing the driving part to impress an automatically-graduated torque on the driven part, said torque being jointly produced by electromagnetic induction and friction, the electromagnetic effect preponderating at first but being gradually replaced by the frictional effect.

9. The method of gradually and without shock accelerating the driven part of a clutch, which consists in causing the driving part to impress a graduated torque on the driven part, said torque being jointly produced by electromagnetic induction and friction, the frictional effect being practically constant and the inductional effect gradually decreasing during the period of acceleration.

10. The method of graduating the action of an electromagnetic clutch which consists in producing a retarded or slow growth of the magnetic field in said clutch.

11. The method of causing an instantaneous release of the members, of an electromagnetic clutch which consists in producing in the inducing member of the same a plurality of magnetic fields, which tend to neutralize each other when the magnetizing force is withdrawn.

12. The method of varying the speed of a driven part, which consists in producing between the driving and the driven parts a controllable joint inductive and frictional slip.

13. The method of varying the speed of a driven part, which consists in producing between the driving and driven parts, a controllable slip, said slip being jointly inductive and frictional and increasing the frictional torque after the driven part has been accelerated to a point near full speed, thereby bringing the driven part to full speed.

14. The method of accelerating the speed of a driven part, which consists in establishing between the driven and the driving parts a controllable slip, bringing the driving part to full speed and accelerating the driven part by inductive influence between the surfaces between which said controllable slip takes place.

15. The method of accelerating the speed of a driven part, which consists in establishing between the driven and the driving parts a controllable slip, accelerating the driven part by inductive influence between said controllable-slip surfaces and also subjecting said surfaces to frictional action, thereby superimposing a frictional torque upon the torque-due to said induction for the purpose of bringing the driven part to full speed.

16. The herein-described method which consists in creating a magnetic field in one of the members of a power-transmitting device, subjecting the second member to said magnetic field to create in said secondary member torque-producing induced currents, positively moving one of said members to thereby exert a torque upon the other member through the agency of said induced currents and supplementing the torque-producing effect of said induced currents by the torque-producing effect of frictional contact between said primary and secondary members.

17. The herein-described method which consists in creating a magnetic field in one of the members of a power-transmitting device, subjecting the second member to said magnetic field to create in said secondary member torque-producing induced currents, positively moving one of said members to thereby exert a torque upon the other member through the agency of said induced currents supplementing the torque-producing effect of said induced currents by the torque-producing effect of frictional contact between said primary and secondary members, and varying the magnetic field of said primary member to vary the rate of movement of said secondary member.

18. The herein-described method which consists in creating a magnetic field in one of the members of a power-transmitting device, subjecting the second member to said magnetic field to create in said secondary member torque-producing induced currents, positively moving one of said members to thereby exert a torque upon the other member through the agency of said induced currents and supplementing the torque-producing effect of said induced currents by the torque-producing effect of continuous frictional contact between said primary and secondary members.

19. The herein-described method which consists in creating a magnetic field in one of the members of a power-transmitting device, subjecting the secondary member to said magnetic field to create in said secondary member torque-producing induced currents, positively moving one of said members to thereby exert a torque upon the other member through the agency of said induced currents, supplementing the torque-producing effect of said induced currents by the torque-producing effect of continuous frictional contact between said primary and secondary members, and varying the magnetic field to vary the rate of movement of said secondary member.

20. The herein-described method which consists in creating a magnetic field in one of the members of a magnetic clutch or accelerator, subjecting the other member to the inductive influence thereof, and positively rotating one of said members in mechanical contact with the other member to cause said latter-mentioned member to rotate by induction.

21. The herein-described method which consists in creating a magnetic field in one of the members of a magnetic clutch or accelerator, subjecting the other member to the inductive influence thereof, positively rotating one of said members in mechanical contact with the other member to cause said latter-mentioned member to rotate by induction, and subjecting said primary member and secondary member to mechanical pressure to produce a frictional turning effort to aid the inductive effect.

22. The herein-described method which consists in creating a magnetic field in one member of a magnetic clutch or accelerator having suitable polar surfaces, opposing a secondary member thereto in mechanical contact, constraining the lines of force to flow in substantially tangential paths in passing from pole to pole through said secondary member, positively rotating one member whereby the other is caused to rotate by induction and subjecting said primary and secondary members to mechanical pressure, whereby a frictional turning effort is produced to aid said induction.

23. The herein-described method which consists in creating a magnetic field in one of the members of a magnetic clutch or accelerator, subjecting the other member to the inductive influence thereof, positively rotating one of said members in mechanical contact with the other member to cause said latter-mentioned member to rotate by induction and varying the magnetic field to vary the movement of said latter-mentioned member.

In witness whereof I have hereunto subscribed my name in the presence of two witnesses.

HENRY H. CUTLER.

Witnesses:
W. PERRY HAHM,
M. R. ROCHFORD.